United States Patent [19]

Baker

[11] 4,191,206
[45] Mar. 4, 1980

[54] AUTOMATIC WIND BRACE FOR SIDE ROLL IRRIGATION SYSTEM

[76] Inventor: Larry W. Baker, Rte. 1, Box 52 C, Burley, Id. 83318

[21] Appl. No.: 947,486

[22] Filed: Oct. 2, 1978

[51] Int. Cl.² ............................................. B05B 3/18
[52] U.S. Cl. ...................................... 137/344; 188/7; 239/212
[58] Field of Search ................ 137/344; 239/177, 212, 239/213; 188/6, 7

[56] References Cited

U.S. PATENT DOCUMENTS

| | | | |
|---|---|---|---|
| 2,766,996 | 10/1956 | Jacoby | 239/212 X |
| 3,071,327 | 1/1963 | Cornelius | 137/344 X |
| 3,618,859 | 11/1971 | Watts | 239/212 |
| 3,726,366 | 4/1973 | Williams | 137/344 X |

*Primary Examiner*—Gerald A. Michalsky
*Attorney, Agent, or Firm*—Oliver D. Olson

[57] ABSTRACT

An elongated brace member is attached adjacent its inner end pivotally to a base member clamped to the outer circumference of a wheel, a plurality of which support through their hubs an elongated assembly of interconnected irrigation pipes. The inner end of the brace member is connected to the base member through an extensible and retractable damper cylinder which functions to delay the pivotal movement of the brace member from a retracted, inoperative position in which it extends substantially parallel to the irrigation pipe line, to an extended, operative position in which it projects angularly outward and downward from the wheel into engagement of its outer end with the ground. In an alternate construction the base member is secured to the outer end of an elongated post which extends radially outward from the irrigation pipe.

12 Claims, 5 Drawing Figures

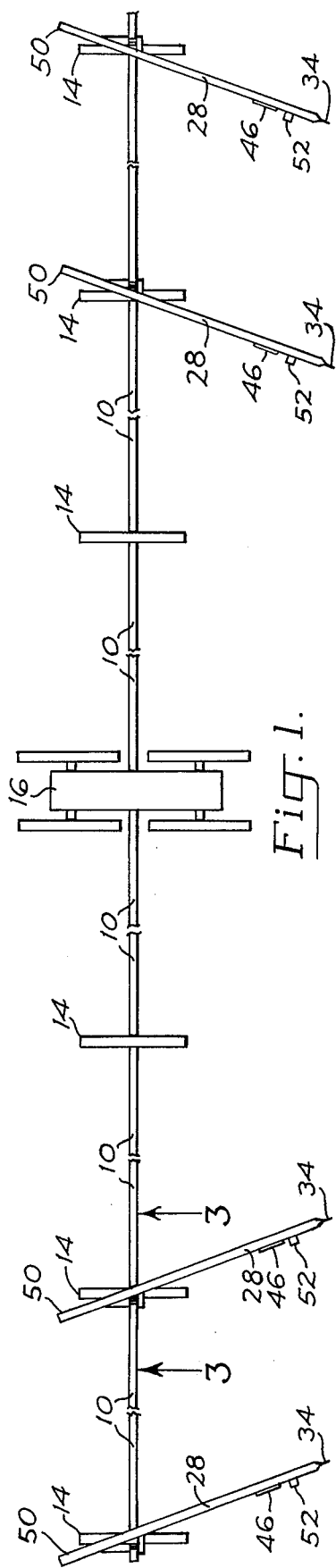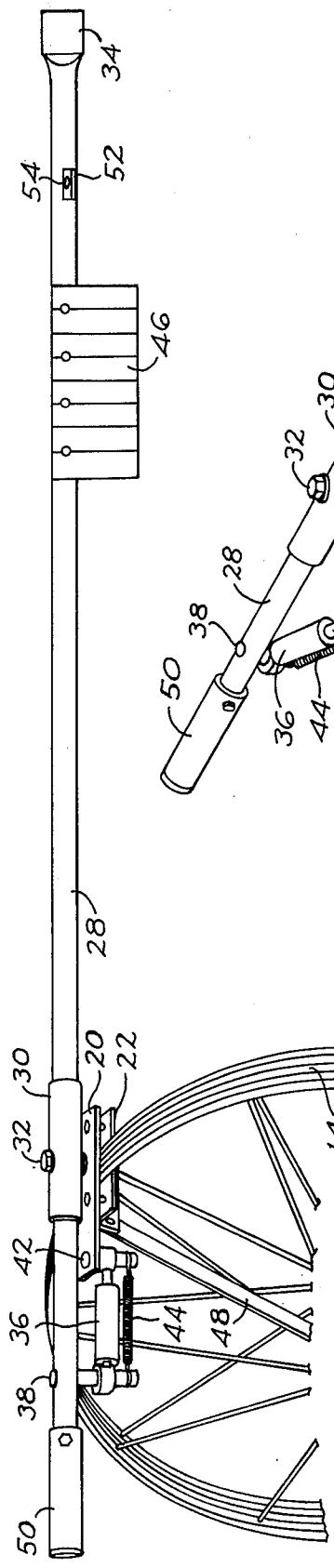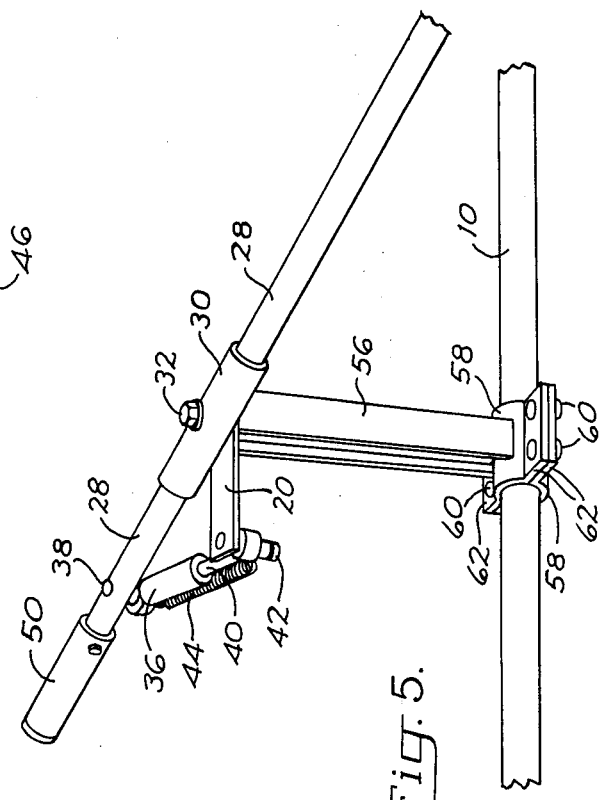

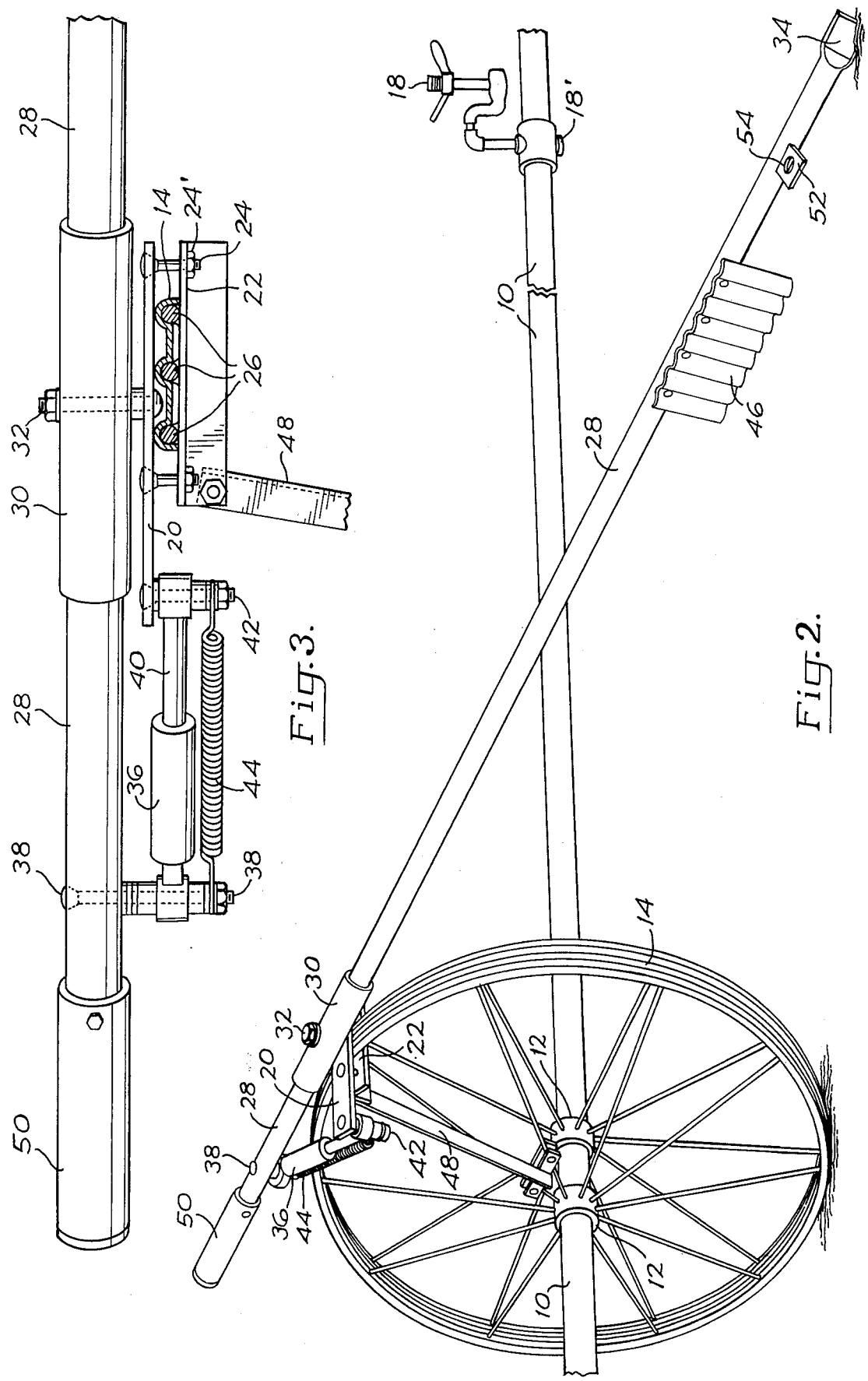

AUTOMATIC WIND BRACE FOR SIDE ROLL IRRIGATION SYSTEM

BACKGROUND OF THE INVENTION

This invention relates to wheel-supported side roll irrigation systems, and more particularly to a bracing mechanism by which to prevent movement of such an irrigation system under the influence of wind.

Wheel-supported, side roll irrigation systems may extend for one-half mile or more and are moved by a central, power-driven mover or a plurality of such movers. When empty, and therefore quite light in weight, winds of even moderate velocity may cause the wheels to roll relative to the mover, in which case the irrigation pipes become twisted or otherwise damaged, often beyond repair.

Wind braces have been provided heretofore by various types of attachments of an elongated brace to the irrigation pipe or wheel hub. Winds often reach magnitudes which cause the system to vault over the brace, resulting in damage to the system. Further, some of such braces heretofore have had to be adjusted manually to the downwind side of the system, and changed manually to the opposite side when the wind changes direction. Some have to be removed or anchored in inoperative position to allow movement of the system to the next location of irrigation. These problems incur the excessive cost of manual labor and irrigation down time.

Typical of the foregoing types of wind braces which are attached to the irrigation pipe or wheel hub, are U.S. Letters Pat. Nos. 3,071,327; 3,618,859; and 3,726,366. The first listed patent also requires manual adjustment to the downwind side of the irrigation system.

U.S. Letters Pat. No. 2,766,996 disclosed a wind brace which is secured to the outer periphery of a wheel of a wheel-supported irrigation system. However, it requires attachment to the wheel for projection in the downwind direction, and therefore requires detachment and relocation of the attachment every time the wind reverses direction. It also requires detachment from the wheel when the system is to be moved to the next location of irrigation.

SUMMARY OF THE INVENTION

In its basic concept, this invention provides for wheel-supported, side roll irrigation systems an automatic wind brace which includes an elongated brace member mounted pivotally adjacent its inner end on a base member supported by the irrigation system at a location radially outward of the axis of the supporting wheels, and an extensible damper member pivotally interconnecting the base and brace members for delaying movement of the brace member from its retracted, inoperative position disposed substantially parallel to the irrigation pipeline, to its extended, operative position projecting angularly downward into engagement of its outer end with the ground.

It is by virtue of the foregoing basic concept that the principal objective of this invention is achieved; namely, to overcome the aforementioned disadvantages and limitations of prior wind braces.

Another objective of this invention is to provide an automatic wind brace of the class described which is retained in inoperative position for sufficient time to afford movement of the irrigation system to a new location of irrigation without the labor cost of manual assistance.

Still another objective of this invention is the provision of a wind brace of the class described that can be installed with space and facility on all conventional types of wheel-supported side roll irrigation systems, without modification of the system.

A further objective of this invention is the provision of a wind brace of the class described that is of simplified construction for economical manufacture.

The foregoing and other objects and advantages of this invention will appear from the following detailed description, taken in connection with the accompanying drawings of preferred embodiments.

BRIEF DESCRIPTION OF THE DRAWINGS

FIG. 1 is a foreshortened plan view of a side roll irrigation system having associated therewith a plurality of wind braces embodying the features of this invention.

FIG. 2 is a fragmentary perspective view of one of the support wheels and attached wind brace of the system illustrated in FIG. 1, the wind brace being shown in the operative, bracing position.

FIG. 3 is a fragmentary sectional view taken on the line 3—3 in FIG. 1.

FIG. 4 is a fragmentary perspective view, similar to FIG. 2, showing the wind brace in the inoperative position which allows the irrigation system to be moved to a new set.

FIG. 5 is a fragmentary perspective view showing an alternative form of mounting for the wind brace of this invention.

DESCRIPTION OF THE PREFERRED EMBODIMENT

FIG. 1 of the drawings illustrates diagrammatically a conventional side roll irrigation system. It includes a plurality of elongated sections of irrigation pipe 10 coupled together to form a continuous pipeline. The continuous pipe is supported at longitudinally spaced intervals by the hubs 12 of a plurality of wheels 14, and the assembly is moved along the ground by means of a centrally located power-driven mover 16. As is well known, the mover is connected to the central section of irrigation pipe in such manner as to rotate the entire pipeline about its longitudinal axis as the mover travels over the ground. Accordingly, axial rotation of the irrigation pipeline functions to rotate the supporting wheels 14.

Wheel-supported, side roll irrigation systems of the foregoing type extend one-half mile or more, as previously mentioned. The irrigation pipeline 10 is supported at varying heights above ground, to accommodate the irrigation of a variety of crops, by means of wheels 14 varying in diameter from three to twenty feet or more.

In a typical irrigation system of this class, the irrigation pipeline 10 extends about one quarter mile in length and is supported at the hubs of six foot diameter wheels 14 which are spaced apart about forty feet along the length of the pipeline. An irrigation sprinkler head 18 with automatic leveler, preferably with automatic drain valve 18′ (FIG. 2), is located on the pipeline centrally between adjacent wheels. A source of water under pressure is coupled to one end of a pipeline, the opposite end of the pipeline being closed, and the sprinkler heads are arranged to irrigate an area of about fifty five feet in width, laterally the full length of the irrigation system.

After a given area has been irrigated to the desired degree by the irrigation system, the water supply is turned off, the irrigation pipeline is drained of water to minimize the weight of the system, and the power-driven mover or movers 16 is activated to move the system a distance equal to three revolutions of the supporting wheels 14, or about fifty five feet. The source of water under pressure then is once again connected to the end of the pipeline to commence irrigation of the area to which the system has been moved.

As explained hereinbefore, during the time that the irrigation pipeline has been drained of water, it is susceptible of being moved under the influence of winds. Thus, it is during this time that the wind brace of this invention functions automatically to be swung to either side of the pipeline to prevent such movement and the consequence damage to the system.

Referring primarily to FIGS. 2 and 3 of the drawings, the wind brace illustrated therein includes an elongated base plate 20 which is secured detachably to the outer periphery of one of the pipeline supporting wheels 14. As illustrated, the attachment is provided by a clamp bar 22, in the form of an angle iron, which underlies the base plate and captures between them the peripheral rim portion of the wheel. A pair of clamp bolts 24 are secured to the base plate, on opposite sides of the wheel rim, and extend through registering openings in the clamp bar for reception of the clamp nuts 24'. Tightening of the clamp nuts thus draws the base plate and clamp bar together and clamps them securely to the wheel rim.

To prevent twisting of the base plate and clamp bar relative to the radius of the wheel, at least one, and preferably two or three lengths of rod or pipe 26 is welded or otherwise secured to the clamp bar for reception in the annular central and side grooves of the wheel rim. Alternatively, such a length of rod or pipe may be secured to the clamp bar or to the underside of the base plate for abutting each lateral side of the wheel rim.

The wind brace of this invention also includes an elongated brace member 28 which is secured adjacent its inner end pivotally to the base member for movement between a retracted position (FIG. 4) in which the brace member extends substantially parallel to the pipeline 10, and an extended position projecting angularly downward into engagement of its outer end with the ground (FIG. 2). In the embodiment illustrated, the elongated brace member extends through a short reinforcing sleeve 30 and is there secured pivotally intermediate its ends to the base member by means of a pivot bolt 32. The outer end of the brace member is flattened or otherwise provided with a blade-shaped point 34 for penetrating the ground and thus forming a secure anchor.

It is to be noted from the drawings that a substantial portion of the length of the brace member projects beyond the base plate 20, and therefore it would swing quickly to the operative position of FIG. 2 by gravity unless means were provided to delay it. Without such delay, movement of the brace member to the operative, ground-engaging position of FIG. 2 would prevent movement of the irrigation system by the central power-driven mover 16 to a new location of irrigation.

Thus, means is provided for damping the speed of pivotal movement of the brace member 28 from the inoperative position of FIG. 4 to the operative position of FIG. 2. The damper mechanism illustrated comprises an elongated, extensible and retractable piston-cylinder unit. As illustrated, one end of the cylinder 36 of the unit is connected pivotally, by means of a pivot bolt 38, to the brace member 28 inwardly of the pivot bolt 32. The piston rod 40 extending from the opposite end of the cylinder is connected pivotally, by a pivot pin 42, to the base plate 20.

Means, such as check valves, are provided on the cylinder for allowing retraction of the piston rod quickly into the cylinder and for delaying extension of the piston rod outwardly from the cylinder. In this manner, the brace member is capable of swinging quickly from the operative position of FIG. 2 to the retracted, inoperative position of FIG. 4. This rapid retraction may be enhanced by connecting a coil spring 44 in parallel with the piston-cylinder unit, between the bolts 38 and 42. However, swinging of the brace member from the inoperative position of FIG. 4 to the operative position of FIG. 2 is delayed for a time sufficient to allow normal movement of the power-driven mover 16 over the ground, and hence corresponding movement of the supporting wheels 14, before the brace member reaches a downwardly projecting position in which it would prevent further movement of the attached wheel.

By this means, the irrigation system is capable of being moved, by rotation of the supporting wheels, while the elongated brace member is retained in sufficiently retracted position to allow the attached wheel to roll over it.

The pivotal mounting of the brace member 28 on the base member 20 accommodates movement of the brace member to operative position on either side of the pipeline 10, depending upon the direction of wind. For this purpose, a wind vane 46 is secured to the outer portion of the brace member and projects downward therefrom for impingement by the wind. The force thus exerted against the vane by the wind functions to initiate movement of the brace member in the downwind direction, to move the brace member to operative position where its outer end engages the ground and it thereby braces the irrigation system against movement by the wind.

It is to be noted that the wind vane projects downward from the brace member. In this position the wind vane is disposed under the brace member when the latter is in the inoperative position of FIG. 4. Accordingly, the vane is out of contact with the ground during rotational movement of the irrigation system.

The wind vane preferably is provided with a bright surface color, such as silver or orange, so as to be visible to an operator located at one end of the irrigation system. The colored wind vanes are visible to the operator only when the brace members are in the operative position of FIG. 2, thereby giving evidence to the operator that the brace members are in the operative position. If the colored vane members are not visible to the operator, this evidences the fact that the brace members are in the inoperative position of FIG. 4, so that the system can be moved to a new irrigation position.

With further reference to FIG. 4, it is to be noted that when the brace member is in the inoperative position, extending a substantial distance beyond the supporting base member 20, considerable force is exerted on the base member to twist it in a clockwise or counterclockwise direction about the wheel rim 14. To resist this force, a length of chain, cable, rod, angle iron or other form of strap is provided to interconnect the end of the base member opposite the direction of extension of the base member and the wheel hub or irrigation pipe. In the embodiment illustrated, one end of a length of angle iron 48 is connected to the base member and the opposite end is clamped to a pair of the wheel spokes adjacent the hub 12.

This twisting of the base member also may be minimized by providing a counterweight 50 on the end of the brace member 28 opposite the point 34. This counterweight also assists in delaying movement of the brace member from the inoperative position of FIG. 4 to the operative position of FIG. 2.

The operation of the wind brace described hereinbefore is as follows: Let it be assumed that the disposition of the brace members 28 is as illustrated in FIG. 1, wherein they are disposed in the operative position to prevent movement of the side roll irrigation system in the downward direction, i.e. toward the bottom of the drawing. It is to be noted that the brace members extend outward from the pipeline angularly toward the center power-driven mover 16. This arrangement tends to stretch the pipeline outwardly to both sides of the mover, thereby keeping the system straight.

Let it be assumed, further, that it is now desired to move the entire irrigation system further downward to the next location of irrigation. Accordingly, the pipeline 10 is drained of water, as previously described, to minimize its weight and thus minimize the load applied to the power-driven mover 16. The mover then is first activated to move the entire system upward toward the top of the drawing, a short distance of for example about 90° to 110° rotation of the wheels, sufficient to elevate the outer ends of the brace members 28 so that the latter will swing by gravity toward the retracted position of FIG. 4. The brace members reach this position of retraction rather quickly, since the damper cylinders allow very little restriction to retraction of their associated piston rods, and also because of the contraction of spring 44. However, further swinging movement of the brace members beyond the retracted position is dampened by virtue of the restricted extension of the piston rods from the cylinders, due to the action of the check valves and the counterweight.

The center power-driven mover 16 then is activated to drive the entire irrigation system toward the bottom of the drawing in FIG. 1. This power-driven movement of the system occurs at a rate of speed which is faster than the dampened movement of the brace members from the retracted position of FIG. 4 to the extended position of FIG. 2. Accordingly, the supporting wheels 14 are allowed to continue their rotation, for the number of times necessary to bring the system to the next desired location of irrigation. At that position, the brace members will remain in the retracted position of FIG. 4 or they will be moved by wind or gravity automatically to the operative position of FIG. 2.

If the wind reverses direction, the wheels 14 will rotate in the downwind direction until the brace members 28 are elevated and swung to the opposite side of the pipeline, as will be apparent.

The action of the piston-cylinder damper unit also prevents excessive swinging of the brace member in response to transient gusts of wind, which otherwise would move the brace member to a position where gravity would cause it to continue moving to operative position. Prevention of these excessive movements contributes to quicker response to damaging winds and also minimizes wear of the moving parts of the wind brace.

Means also preferably is provided for securing the irrigation system positively to the ground for storage over the winter months of non-use. For this purpose, a tab 52 is welded or otherwise secured to the outer end portion of each brace member 28, to extend laterally therefrom. A transverse opening 54 in the tab is dimensioned to freely receive an elongated stake (not shown), such as a metal fence post, which may be driven into the ground to form a rigid anchor for the outer end of the brace member. The entire irrigation system thus is secured firmly to the ground against movement by the wind. In this regard, the staking of the brace members preferably is made after the brace members have been moved to the down wind side of the system, with respect to the prevailing direction of wind.

It is to be noted from the foregoing that the inner end of each brace member is secured to the periphery of a supporting wheel 14 and that in the operative position of the brace member the inner end thereof is located, with its supporting base member 20, near the top of the wheel. This arrangement provides maximum bracing action and substantially eliminates any possibility of the irrigation system vaulting over the brace, as frequently occurs with the prior systems in which the brace member is secured to the wheel hub or irrigation pipe. Although this position of the base member near the top of the wheel is preferred for its maximum bracing effect, the position of the base member may be somewhat lower on the wheel and still provide adequate bracing in most situations. It is important, however, that the base member be located no lower than about mid-way between horizontal and vertical planes extending through the axis of the wheel hub, i.e., no lower than about 45° above horizontal. This is accomplished by providing the elongated brace member 28 with a length at least twice the diameter, of the supporting wheel.

Thus, in the exemplified embodiment wherein the supporting wheel is assumed to be about six feet in diameter, the brace member is chosen to be at least twelve feet in length from its pivotal mounting 32 on the base member 20 to its outer end. It is preferred that it be fifteen to eighteen feet in length.

In the embodiment illustrated in FIG. 5, the base member 20 is shown to be mounted at the outer end of an elongated post 56 which is secured detachably at its inner end to the irrigation pipe. This is provided, as illustrated, by securing the inner end of the post to one section of a two component clamp 58 which encircles the pipe and is clamped thereto by means of bolts 60 extending through aligned openings in laterally projecting flanges 62. The length of the post is selected to be substantially the same as the radius of the pipe-supporting wheels 14. Thus, the length of the associated brace member 28 is chosen to be at least four times the length of the post in order for the post to extend angularly upward at least forty five degrees from a horizontal plane through the axis of the pipeline, in the manner previously described.

From the foregoing it will be appreciated that this invention provides an automatic wind brace of simplified construction for economical manufacture, which is readily adaptable for attachment to conventional wheel supported side roll irrigation systems available from a variety of manufacturers, without modification of the system in any way, and which functions effectively to brace the system against movement in either direction automatically in accordance with the direction of wind. Since the wind brace is operated automatically by wind velocity, it may remain permanently attached to the irrigation system, thereby limiting the cost of labor only to necessary maintenance and repair.

It will be apparent to those skilled in the art that various changes may be made in the size, shape, type, number and arrangement of parts described hereinbefore. For example, the cylinder 36 may be connected to the brace member 28 at a point outwardly of the pivot 32, i.e. toward the point 34, rather than inwardly thereof as illustrated, by reversing the direction of damping. The connections of the piston rod and cylinder may be reversed from the arrangement illustrated. Although the piston-cylinder unit illustrated is of the pneumatic type, an hydraulic unit may be used if desired. The damping action may be provided for both extension and retraction of the piston-cylinder unit. These and other modifications and changes may be made without departing from the spirit of this invention.

Having now described my invention and the manner in which it may be used, I claim:

1. A wind brace for a side roll irrigation system wherein lengths of interconnected irrigation pipes are supported through the hubs of a plurality of spaced-apart wheels, the wind brace comprising:
   (a) a base member,
   (b) attaching means for mounting the base member on a side roll irrigation system radially outward of the irrigation pipe thereof,
   (c) an elongated brace member having inner and outer ends,
   (d) pivot means on the base member mounting the brace member adjacent the inner end thereof for pivotal movement of the brace member between a retracted, inoperative position substantially parallel to the irrigation pipe and an extended, operative position projecting angularly downward to the ground, and
   (e) damper means interconnecting to the base member and the brace member for delaying pivotal movement of the brace member from its retracted position to its extended position.

2. The wind brace of claim 1 wherein the damper means comprises an extensible-retractable piston-cylinder unit.

3. The wind brace of claim 1 wherein the damper means comprises an extensible-retractable piston-cylinder unit the movement of which corresponding to the extending movement of the brace member is restricted relative to its movement in the opposite direction.

4. The wind brace of claim 1 wherein the length of the brace member is selected to position the pivot means above and on a radial plane through the irrigation pipe at least forty five degrees from a horizontal radial plane through the irrigation pipe.

5. The wind brace of claim 1 wherein the attaching means comprises clamp means on the base member for securing the latter detachably to the periphery of a wheel of a side roll irrigation system.

6. The wind brace of claim 5 wherein the clamp means comprises a clamp bar secured to the base member by a pair of bolts, the clamp bar and base member being arranged to clamp between them the periphery of a wheel of a side roll irrigation system.

7. The wind brace of claim 5 wherein the length of the brace member is at least about twice the diameter of the supporting wheel.

8. The wind brace of claim 1 wherein the attaching means comprises a post adapted to be mounted detachably at its inner end of the irrigation pipe of a side roll irrigation system, the post extending radially outward of the pipe and the base member being mounted on the outer end of the post.

9. The wind brace of claim 8 wherein the length of the brace member is at least about four times the length of the post.

10. The wind brace of claim 1 including a wind vane on the brace member projecting therefrom in a plane parallel to the longitudinal axis thereof for receiving the force of wind for moving the brace member from its retracted position toward its extended position.

11. The wind brace of claim 10 wherein the wind vane projects downward from the underside of the brace member.

12. The wind brace of claim 1 including anchor means on the brace member for securing the latter releasably to the ground.

* * * * *